US005943862A

United States Patent [19]

Malina

[11] Patent Number: 5,943,862

[45] Date of Patent: Aug. 31, 1999

[54] HYDROPNEUMATIC MACHINE TOOL WITH CUSHIONING

[75] Inventor: Viktor Malina, Kisslegg, Germany

[73] Assignee: Tox Pressotechnik GmbH, Weingarten, Germany

[21] Appl. No.: 08/952,946

[22] PCT Filed: Mar. 19, 1997

[86] PCT No.: PCT/DE97/00559

§ 371 Date: Mar. 5, 1998

§ 102(e) Date: Mar. 5, 1998

[87] PCT Pub. No.: WO97/35114

PCT Pub. Date: Sep. 25, 1997

[30] Foreign Application Priority Data

Mar. 19, 1996 [DE] Germany ........................... 196 10 726

[51] Int. Cl.[6] ............................ F15B 7/00; F15B 15/22; B60T 13/58

[52] U.S. Cl. ................................ 60/560; 60/563; 91/405

[58] Field of Search ............................ 60/560, 563, 565, 60/583, 591, 413, 414; 91/405, 408, 409

[56] References Cited

U.S. PATENT DOCUMENTS

| | | | |
|---|---|---|---|
| 2,032,185 | 2/1936 | Sciaky | 60/567 |
| 2,949,096 | 8/1960 | Ottestad et al. | 91/408 X |
| 3,413,894 | 12/1968 | Kress et al. | 91/405 X |
| 3,426,530 | 2/1969 | Georgelin | 60/560 |
| 4,099,436 | 7/1978 | Beneteau | 60/560 X |
| 4,135,076 | 1/1979 | Beneteau | 60/593 X |
| 4,153,180 | 5/1979 | Fernique | 60/560 X |
| 4,208,879 | 6/1980 | Segawa | 60/563 X |
| 4,300,351 | 11/1981 | Grullmeier | 60/560 |
| 5,040,369 | 8/1991 | Rapp | 60/560 |
| 5,218,821 | 6/1993 | Beneteau | 60/560 |
| 5,247,870 | 9/1993 | Brasca et al. | 60/560 X |
| 5,247,871 | 9/1993 | Brasca et al. | 60/560 X |
| 5,265,423 | 11/1993 | Glaser | 60/560 |
| 5,377,488 | 1/1995 | Malina | 60/560 |
| 5,381,661 | 1/1995 | Malina | 60/560 |
| 5,526,644 | 6/1996 | Brieschke | 60/565 |
| 5,649,424 | 7/1997 | Valavaara | 60/560 |
| 5,836,161 | 11/1998 | Malina | 60/560 |
| 5,865,029 | 2/1999 | Brieschke | 60/560 |

FOREIGN PATENT DOCUMENTS

| | | | |
|---|---|---|---|
| 2840978 | 3/1980 | Germany | 60/563 |

*Primary Examiner*—John E. Ryznic

*Attorney, Agent, or Firm*—Edwin E. Greigg; Ronald E. Greigg

[57] ABSTRACT

A machine tool which operates with a hydropneumatic pressure intensifier whose step piston is braked hydraulically in particular towards the end of its stroke by forcing hydraulic fluid from a braking cavity formed during the stoke via a choke point.

18 Claims, 2 Drawing Sheets

HYDROPNEUMATIC MACHINE TOOL WITH CUSHIONING

BACKGROUND OF THE INVENTION

The invention is based on a hydraulic machine tool as generically defined by the preamble to the main claim. In a known machine tool of this generic type (German Patent 43 01 983), the work stroke of the work piston is braked by causing the step of greatest diameter, namely of the work piston, that serves the purpose of the rapid traverses to strike the bottom of the corresponding pneumatic work chamber; there is a damping disk on the face of the work piston, but it accomplishes only slight damping.

Machine tools of this generic type are intrinsically high-speed, energy-saving pneumatic systems, with which a hydraulic system is integrated, by means of which latter, after a desired forward stroke in the working direction, a power stroke with very high adjusting force is attainable. Although only pneumatic connections to outside the housing of the machine tool are available, the pressure intensification is accomplished with the aid of the hydraulics. As a result, hydraulic chambers along with pneumatic chambers move in the piston stroke direction, which involves the not-inconsiderable problem of sealing the one off from the other. Air that gets into the hydraulic fluid leads to undesired compressibility of the oil; oil leaking out of the hydraulic portion can cause functional failures.

Damping the work stroke, and sometimes the return stroke as well, remains a problem in such machine tools, which use hydropneumatic pressure intensification. Especially whenever a sheet-metal connection, for instance, is to be made via a suitable tool, and upon idling the step piston, pounds into one of its terminal positions with full force, the result cannot only be considerable noise but also attendant damage. Even though this is an old, widespread problem in such machine tools, aside from the aforementioned elastic disk no damping that in particular is also adjustable to the weight or mass of the tool has yet been found.

OBJECT AND SUMMARY OF THE INVENTION

The machine tool of the invention as defined by the characteristics of the main claim has the advantage over the prior art that depending on the cross section of the choke point or throttle restriction, more or less major damping is attainable, especially toward the end of the work stroke, and this cross section at the throttle restriction can be adapted to the masses involved. For this damping, the hydraulic fluid can be used, with which the remaining hydropneumatic pressure intensifier also functions. The seals, which already have high quality, between the pneumatic chamber and the hydraulic chamber also serve to seal off the annular chamber, so that one additional expensive seal is not needed. The invention can already be achieved in a very simple way and highly effectively in such machine tools, which overcomes the prejudices of the professional field. It is admittedly known in work cylinders to damp the terminal position of the work piston hydraulically or pneumatically, but this known provision does not involve step pistons having the problems discussed above.

In an advantageous feature of the invention, the step piston positively displaces fluid out of the annular chamber through a throttle restriction at least toward the end of the return stroke and in order to brake its return stroke motion. In this way, both the forward motion and the return motion of the step piston and thus the lower dead center range and the upper dead center range of the tool are damped in the reciprocating motion; the additional piston collar, disposed on the step piston and serving to damp the work stroke, accomplishes the return stroke damping with its annular face remote from the annular face used for the work stroke.

In a further advantageous feature of the invention, the annular chamber, on at least one of its end portions, has a taper, which corresponds to the diameter of the piston collar and into which the piston collar plunges toward the end of the stroke and positively displaces the fluid volume, enclosed in this braking cavity or braking chamber, through the throttle restriction. As a result, only toward the end of the work stroke or return stroke is the reciprocating motion braked or damped. Instead of this, it is also possible to brake the entire reciprocating motion, in that the piston collar to a greater or lesser extent seals off from the cylinder wall, or the annular chambers located on both sides of the piston collar communicate with one another via a throttle conduit.

In a further advantageous feature of the invention, the annular chamber can be made to communicate with the work chamber during the work stroke and/or the return stroke. In this way, depending on the control, the hydraulic fluid can flow unthrottled from the annular chamber to the work chamber, unless braking is to be done just at that time. As a result, the replenishment of hydraulic oil via the extra replenishing devices always provided for the purpose at the same time serves to provide hydraulic damping. However, the annular chamber may also be completely separate from the work chamber and may be located at some other point of the step piston, for instance in the region of the piston rod.

In a further advantageous feature of the invention, the play defined between the piston collar and the annular chamber wall of the annular chamber acts as the throttle restriction. In the case of a taper in the end portions of the annular chamber, the damping naturally is operative only in those regions.

In a further advantageous feature of the invention, a relief conduit branches off from the braking chamber (from the volume enclosed), in which conduit there is a control element for controlling the passage of fluid. The relief conduit can again discharge according to the invention into the annular chamber. Thus the relief conduit can also lead from one braking chamber to the other, and the braking chamber are each activated in alternation, and it is also possible for two control elements to be disposed in the relief conduit, one for the one braking chamber and the other for the other braking chamber, which are then in action in alternation.

In a further advantageous feature of the invention, a bypass conduit, connecting the braking chamber to the storage chamber, is present, with a check valve that blocks in the direction of the storage chamber. Such a bypass bypasses the point at which the plunger piston separates the work chamber and the storage chamber from one another in order during the rapid traverse stroke to achieve rapid filling of the work chamber. As a result, in the invention, at the beginning of the rapid traverse stroke, fast replenishment of the work chamber, specifically via the braking chamber, is attained in the work stroke direction.

In a further advantageous feature of the invention, a bypass conduit, connecting the annular chamber to the work chamber, is present, with a check valve that blocks in the direction of the work chamber. Advantageously, this bypass conduit extends within the work piston. Via the check valve, a pressure equilibrium is attained when the step piston moves away from its terminal position, or in other words before the return stroke begins.

In a further advantageous feature of the invention, a short-circuit conduit, connecting the annular chamber to the work chamber, is disposed in the work piston, the orifice of the short-circuit conduit being present on the piston collar and the short-circuit conduit is closed, at least partially, toward the end of the work stroke, by the taper in the annular chamber. This short-circuit conduit also serves as an overflow bore to equalize volume as the step piston moves out of its outset position, or in other words at the beginning of the work stroke.

In a further feature of the invention, which is also claimed on its own, the storage chamber is disposed in a storage cylinder and is defined via a storage piston, which is loaded with low pressure (pneumatically or spring) in order to generate a storage pressure on the side remote from the storage chamber; the center axis of the storage cylinder is disposed parallel to but spaced apart from that of the work piston; and the storage chamber and work chamber are accommodated inside a common tool housing. It is admittedly known, in a welding tool that operates with a hydropneumatic pressure intensifier, to dispose a hydraulic reservoir outside the tool housing and to connect it to the work chamber of the tool via a hydraulic line (U.S. Pat. No. 3,875,365). However, such an arrangement is usable in practical terms only for machine tools installed in stationary fashion.

In a feature of the invention that is advantageous in this respect, a helical spring serves to generate the low pressure. This has the advantage that the hydraulic oil is always at a low pressure that is sufficient to ventilate the hydraulic region. When pneumatics are used for relieving the piston of the reservoir, which reservoir is normally switched off during the return stroke, with the disadvantage that in that case ventilation of the hydraulic region cannot be done.

In another feature of the invention in this respect, a control rod protruding to outside the storage cylinder is disposed on the storage piston and has a longitudinal conduit (control bore), leading to the storage chamber, the end of which conduit remote from the storage chamber discharges into a control chamber that is closed from the outside but is visible from the outside. As a result, the actual oil level can be ascertained visually at any time, and during all the work steps, namely for the rapid traverse stroke, the work stroke, and the return stroke.

In a further feature of the invention in this respect, the control chamber is disposed in a transparent (glass or plastic) control bush (screwed nipple) secured to the end of the control rod. This control bush may be of glass or plastic. In each case, this makes it very simple for the operator of the machine tool to see whether the oil is low.

In a further advantageous feature of the invention, the control chamber can be ventilated to the outside via a ventilating device. This ventilation device may advantageously be a bore, which can be conceived of as a continuation of the longitudinal conduit all the way through the control chamber.

In a further advantageous feature of the invention, the hydraulic communication between the storage chamber and work chamber is embodied as a transverse bore, which is disposed in the tool housing, is accessible from outside the tool housing, and can be used for oil replenishment. Depending on the location of the machine tool, this bore may also be used for ventilation.

In a further advantageous feature of the invention, the plunger piston is disposed coaxially with the work piston and is actuatable via a pneumatic piston counter to the force of a restoring force. Especially whenever the storage chamber is disposed not around the plunger piston but rather parallel to and spaced apart from it, the work cylinder that receives the pneumatic piston of the plunger piston can be shortened, making it possible to shorten the total structural length of the machine tool.

In a further, alternative feature of the invention, the pressure generator has a storage chamber disposed coaxially with the plunger piston, the common longitudinal axis being disposed parallel to that of the step piston, having a pressure conduit connecting the pressure generator to the work chamber, wherein after the work stroke has ended and after a corresponding replenishing flow of fluid out of the storage chamber into the work chamber, the plunger piston blocks the pressure conduit, after which upon a further stroke of the plunger piston a high pressure can be generated in the work chamber. In principle, such an arrangement is known (German Patent 43 01 983).

Further advantages and advantageous features of the invention may be learned from the ensuing description of the drawing and from the claims.

BRIEF DESCRIPTION OF THE DRAWINGS

Three exemplary embodiments of the subject of the invention are shown, some with variants, each in longitudinal section in the drawing and will be described in further detail below. Shown are.

DETAILED DESCRIPTION

All three exemplary embodiments function as stroke-controlled machine tools, each with a hydropneumatic pressure intensifier. With such a pressure intensifier, compressed air is used for a rapid traverse, namely for the approach of the tool to the workpiece, while conversely for the actual work stroke, a hydraulic high pressure is generated via a piston likewise driven by compressed air, and by means of this high pressure the tool is actuated.

Figure 2:
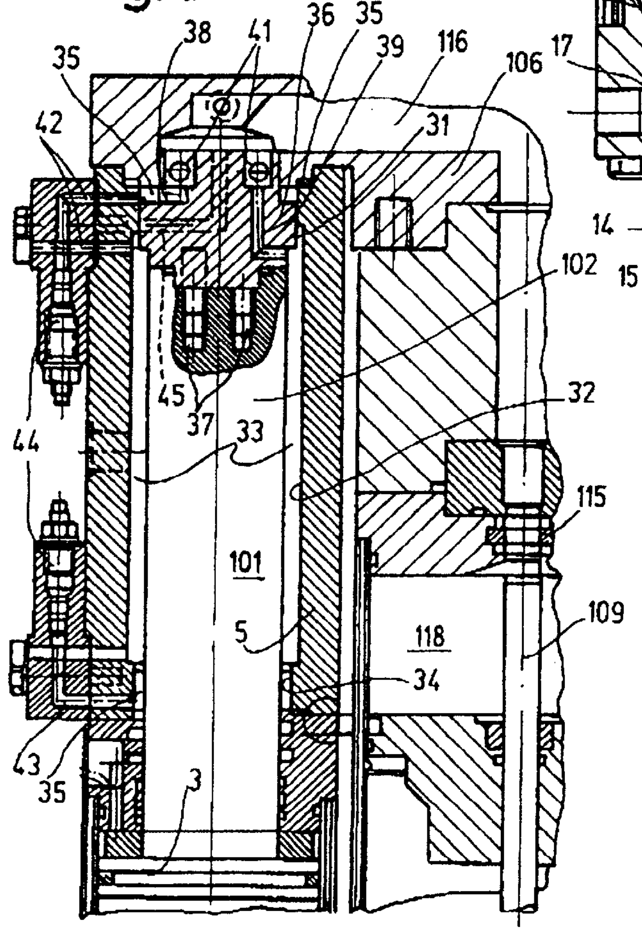
FIG. 2, a variant of the first exemplary embodiment shown as a detail.
Figure 3:
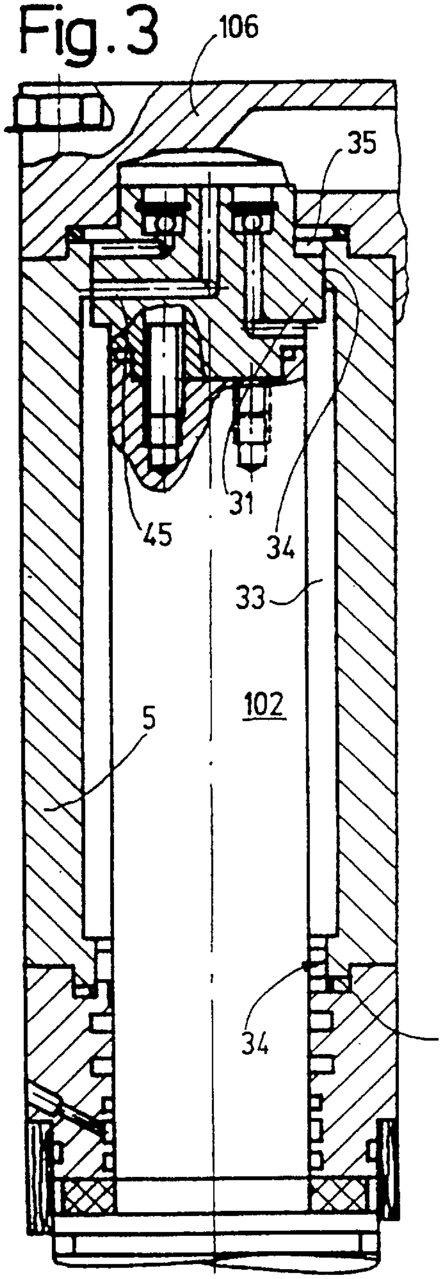
FIG. 3, a further variant of the first exemplary embodiment, again shown as a detail.

For the sake of simplicity, in the ensuing description the same two-digit reference numerals are used for equivalent parts, and these same reference numerals for the first and second variant of the first exemplary embodiment in FIGS. 2 and 3 are each raised by 100, while for the second and third exemplary embodiments they are raised by 200 to 300.

Figure 1:
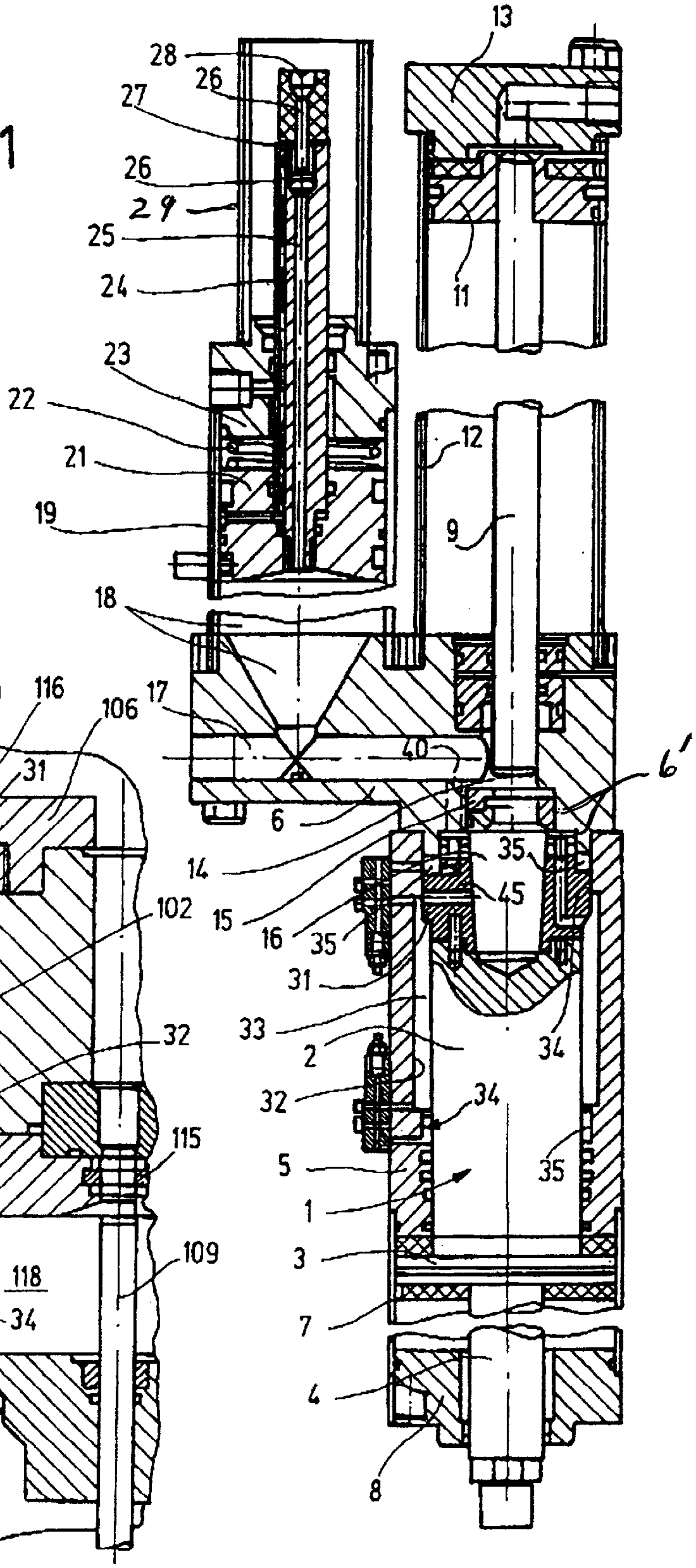
FIG. 1, the first exemplary embodiment in longitudinal section.

In the first exemplary embodiment shown in FIG. 1, there is a step piston 1, whose individual steps are formed by a work piston 2, a drive piston 3, and a piston rod 4. The work piston 2 functions in a work cylinder 5, which is part of the tool housing 6 and which is adjoined by a cylinder barrel 7, in which the drive piston 3 functions and on which, on the side remote from the work cylinder 5, a cylinder head 8 is disposed, in whose central bore the piston rod 4 is supported. The drive piston 3 can be acted upon on both sides by compressed air in a known manner, as a result of which a rapid traverse of this step piston in both reciprocation directions is effected.

Coaxially to the step piston 1, a plunger piston 9 is shown in the upper part of the machine tool; it is drivable by means of a pneumatic piston 11 and is shown with two different diameters in longitudinal halves in the drawing; naturally, each diameter effects a different positive displacement of oil per unit of reciprocation. The pneumatic piston 11 operates in a cylinder barrel 12, which is mounted on the tool housing 6 and is closed off by a cylinder head 13. Via this cylinder head 13, the compressed air is also delivered to actuate the pneumatic piston 11, the adjustment being effected counter to a restoring force, which by way of example may be controlled compressed air or may be a helical spring. The plunger piston 9 plunges with its free end into a chamber 14, which, communicates with a work chamber 16, located below a ring seal 15 secured in a step bore 6' in the housing 6, so that the plunger piston 9 in its reciprocating motion and on passing through the ring seal 15 divides the chamber 14 from the chamber 16 and in accordance with its cross-sectional area generates a corresponding hydraulic high pressure in the work chamber 16. The piston 11 and plunger piston 9 function as a pressure generator for the work chamber 16.

The chamber 14 communicates, via a transverse bore 17 extending in the housing 6, with a storage chamber 18, which is disposed substantially in a pneumatic cylinder 19 and is defined at the top by a storage piston 21. The storage piston 21 is urged in the direction of the storage chamber 18 by a helical spring 22, which is supported, on the side remote from the storage piston 21, on a cylinder head 23 of the pneumatic cylinder 19. A control rod 24 toward the outside of the cylinder head 23 and passing through it is disposed on the storage piston, and in the control rod there is a control bore 25 that passes through the entire control rod in the longitudinal direction and discharges into a control chamber 26. The control chamber 26 is disposed above all in a screwed nipple 27, which comprises transparent material such as plastic or glass, so that it is possible to see from outside whether air has gotten into the hydraulic oil. Ventilation can be done if needed via a ventilation bore 28. To protect the observer, a transparent guard tube 29 is slipped onto the upper end of the cylinder head 23 coaxially around the control rod 24.

A piston collar 31 is disposed on the jacket face of the work piston 2, and an annular groove 32 is present in the work cylinder 5, forming an annular chamber 33 toward the work piston 2 and having tapers 34 on both of its ends, the tapers corresponding to the diameter of the piston collar 31, as shown on a larger scale in FIG. 2. As soon as the piston collar 31, toward the end of its forward stroke or return stroke, plunges into this taper 34, it defines a braking chamber, here identified by reference numeral 35. The volume of fluid enclosed in this braking chamber is positively displaced via a throttle restriction, as described in detail in conjunction with FIG. 2. In the exemplary embodiment shown in FIG. 1, the plunger piston 9 is disposed coaxially with the step piston 1, and the storage piston 21 is disposed parallel to the axes of the storage piston 9 and step piston 1, but spaced apart from them. According to the invention, a bypass 40, shown only in dashed lines, may be disposed between the work chamber 16 and the storage chamber 17, 18, in which bypass, via a check valve, a flow is possible only in the direction toward the work chamber 16, while conversely the flow from the work chamber 16 to the storage chamber 17, 18 is blocked.

In the variant of this first exemplary embodiment, shown in FIG. 2, the pressure generator that has the plunger piston 109 is disposed parallel to the axis of the step piston 1, and the storage chamber 118 is disposed coaxially with the plunger piston 109. This creates a relatively large work chamber 116, namely between the ring seal 115, into which the plunger piston 109 plunges to generate the work pressure, and the upper face end of the work piston 102. Although this enlarges the "idle space" in the work chamber, nevertheless it has the disadvantage that the pressure generator is disposed next to the work cylinder in a space-saving way.

As shown on the enlarged scale in FIG. 2, the work piston 102 has a head part 36, which is connected to the remainder of the work piston 102 by screws 37 and in which bypass conduits 38 and 39 are disposed that connect the respective braking chamber 35 to the work chamber 116 (in FIG. 1, the work chamber 16). Check valves 41, which allow a flow only in the direction of the braking chamber 35, are disposed in these bypass conduits 38, 39, in the region of the orifice toward the work chamber 116. Accordingly, as soon as the piston collar 31 plunges into the taper 34 of the annular groove 32 and thus defines the respective braking chamber 35, no further hydraulic fluid can flow out of this braking chamber 35 into the work chamber via these bypass conduits 38, 39. In the drawing, the work piston 102 assumes its upper outset position, or in other words its position before the onset of the rapid traverse stroke. As soon as the work piston 102, via its drive piston 3, is driven pneumatically downward via its rapid traverse, hydraulic oil can flow out of the work chamber 116 into the braking chamber to replenish it, via the bypass conduit 38 or the check valve 41 located there, so that in this respect there is no hindrance to the drive. As soon as the piston collar 31 has then emerged again from the taper 34, a hydraulic communication is established between the annular chamber 33 and the work chamber 116, so that the piston collar 31 is freely movable. As soon as the end of the rapid traverse stroke is reached, the subsequently driven plunger piston 109 plunges through the ring seal 115 into the work chamber 116 and actuates the work piston 102 via a corresponding hydraulic high pressure. The action of the hydropneumatic pressure intensifier is obtained by the cross-sectional difference of the plunger piston 109, of relatively small cross section, and the work piston 102 of relatively large cross section. As soon as the piston collar 31 then plunges into the lower taper 34, toward the end of the work stroke, a braking chamber 35 is formed there. Although the bypass conduit 39 branches off from this braking chamber 35, in this direction of reciprocation the communication with the work chamber 116 is blocked by the check valve 41. Not until the return stroke of the work piston 102 begins again can hydraulic oil flow into this braking chamber, via the check valve 41 and the bypass conduit 39, so as to hinder the rapid traverse return stroke accomplished via the drive piston 3. Not until the piston collar 31 plunges into the upper taper 34 again is a braking chamber 35 formed again there.

As shown both in FIG. 1 and in the variant of FIG. 2, one relief conduit 42 and 43 branches off from each of the braking chambers 35 and discharges into the annular chamber 33. One throttle valve 44 is disposed in each of these relief conduits. Thus as soon as a suitable pressure arises in the braking chambers 35 as a result of the piston collar 33, the trapped hydraulic fluid is positively displaced back into the annular chamber 33 upon the upper terminal stroke via the relief conduit 32 and upon the lower terminal stroke via the relief conduit 43 and in each case via the respective throttle valve 44. Because of this throttling action, damping, corresponding to the throttling cross section, of the remaining stroke of the work piston 102 is effected. The throttle valve 44 is adjustable in cross section, so that this braking or damping action can be adapted to the particular tool or to its function. An additional control action can be attained by means of a short-circuit conduit 45, which connects the annular chamber 33 to the work chamber 116 (16), and whose orifice toward the annular chamber 33 is disposed on the jacket face of the piston collar 31 and is not blocked until after a certain plunging stroke of this piston collar 31 into the taper 34. Since this short-circuit bore 35 is independent of the braking chamber 35, it has no influence on braking, but does have the advantage that when the work piston 102 moves away from the upper dead center position shown, in this rapid traverse, a rapid equalization of volume can be effected between the annular chamber 33 and the work chamber 116.

FIG. 3 shows a further variant of this first exemplary embodiment, which largely corresponds to that of FIG. 2 and is different only in that an annular gap is present between the piston collar 31 and the taper 34, by means of which gap the desired, but invariable throttling action arises, in that hydraulic fluid is positively displaced out of the braking chamber 35 into the annular chamber 33 upon each reciprocating motion. For some uses of the machine tool of the invention, such an invariable but nevertheless effected damping of the work piston 102 suffices. Otherwise, the variant shown here functions like that of FIG. 2, especially as to the short-circuit conduit 45.

Figure 4:
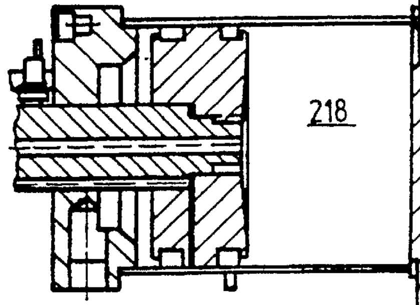
FIG. 4, the second exemplary embodiment.
Figure 4:
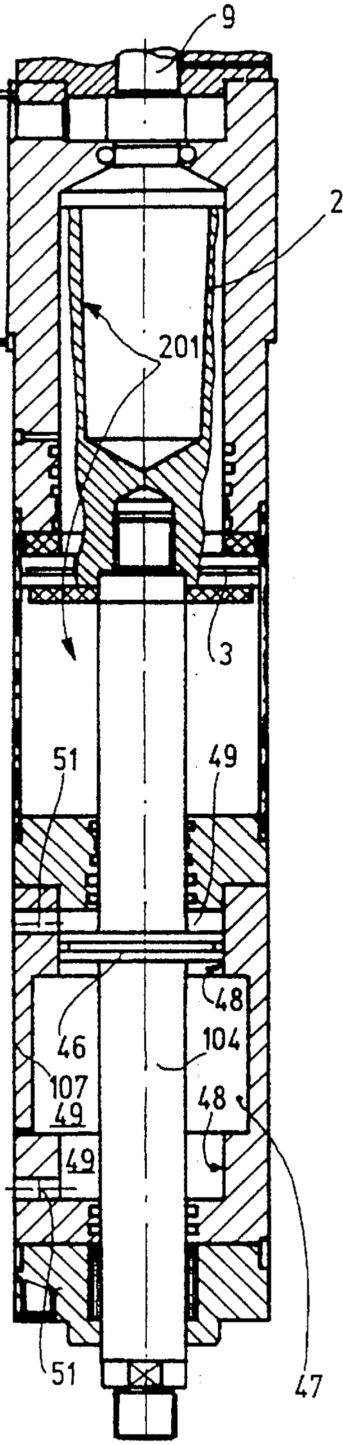

In the second exemplary embodiment shown in FIG. 4, the braking device according to the invention is shifted into the region of the piston rod 104. The other words, such as the work piston 2, plunger piston 9 and drive piston 3, are substantially equivalent to the variant of the first exemplary embodiment as shown in FIG. 1. This is also true of their function. The storage chamber 218, conversely, here is disposed with its center axis cross to the axis of the step piston 201, but this has no effect on the function of this second exemplary embodiment. The control rod 104 here has a piston collar 46, which is movable back and forth in an annular chamber 47 of the cylinder barrel 107 and which in the various terminal stroke positions defines braking chambers 49 by means of tapers 48 of the annular chamber 47. Each of these braking chambers 49 have respective relief conduits 51, which may for instance communicate with one another but in which a throttle device is disposed. The advantage of this second exemplary embodiment is above all that the region of the work piston, with its alternating hydraulic high pressures, is not touched, and that such a damping device can be mounted onto a machine tool in a kind of building block system, where only the cylinder barrel 107 or control rod 104 is correspondingly embodied differently.

Figure 5:
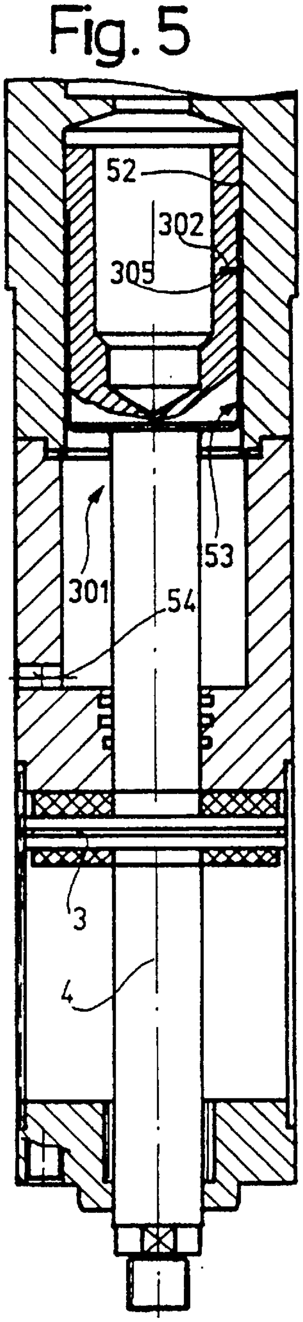
FIG. 5, the third exemplary embodiment, shown as a detail.

In the third exemplary embodiment, shown in FIG. 5, the braking or damping device acts over the entire stroke of the step piston 301. The work piston 302 is radially sealed off by ring seals 52 toward its work cylinder 305, so that the resultant annular chamber 53 acts as a braking chamber, as soon as the hydraulic fluid present in this annular chamber 53 is throttled via a control conduit 54 and a corresponding device. Otherwise, the machine tool functions as described for the first exemplary embodiment.

All the characteristics that can be learned from the specification, claims and drawing may be essential to one another but individually and in arbitrary combinations with one another.

| List of Reference Numerals | |
|---|---|
| 1, 101, 201, 301 | Step piston |
| 2, 202, 302 | Work piston |
| 3 | Drive piston |
| 4, 104 | Piston rod |
| 5, 305 | Work cylinder |
| 6, 106 | Tool housing |
| 7, 107 | Cylinder barrel |
| 8 | Cylinder head |
| 9, 109 | Plunger piston |
| 10 | |
| 11 | Pneumatic piston |
| 12 | Cylinder barrel |
| 13 | Cylinder head |
| 14 | Chamber |
| 15, 115 | Ring seal |
| 16, 116 | Work chamber |
| 17 | Transverse bore |
| 18, 118, 218 | Storage chamber |
| 19 | Pneumatic cylinder |
| 20 | |
| 21 | Storage chamber |
| 22 | Helical spring |
| 23 | Cylinder head |
| 24 | Control rod |
| 25 | Control bore |
| 26 | Control chamber |
| 27 | Screwed nipple |
| 28 | Ventilation bore |
| 29 | Guard tube |
| 30 | |
| 31 | Piston collar |
| 32 | Annular groove |
| 33 | Annular chamber |
| 34 | Taper |
| 35 | Braking chamber |
| 36 | Head part |
| 37 | Screws |
| 38 | Bypass conduits |
| 39 | Bypass conduits |
| 40 | Bypass conduits |
| 41 | Check valve |
| 42 | Relief conduit |
| 43 | Relief conduit |
| 44 | Throttle valve |
| 45 | Short-circuit conduit |
| 46 | Piston collar |
| 47 | Annular chamber |
| 48 | Tapers |
| 49 | Braking chamber |
| 50 | |
| 51 | Relief conduit |
| 52 | Ring seals |
| 53 | Annular chamber |
| 54 | Control conduit |

I claim:

1. A hydropneumatic machine tool comprising an at least three-stage step piston (1, 101, 201, 301), which is axially displaceable for a working stroke or return stroke, and which includes a hydraulically impinged first step acting as a work piston (2, 102, 302), a second step of maximum diameter, pneumatically impinged on at least one side and acting as a drive piston (3) for rapid traverses, and a third step acting as a piston rod (4, 204) disposed on a side remote from the work piston;

a tool housing (6, 106) having a step bore (6') corresponding to an upper end of the step piston;

a hydraulic work chamber (16, 116) and at least one pneumatic work chamber (14) between radial seals, (15) separating the step piston and the step bore (14) at the upper end of the step piston, a pressure generator that generates a hydraulic high pressure in the hydraulic work chamber (16, 116) during a work phase, and in particular that functions with a plunger piston (9, 109) and a pneumatic piston (11); and a storage chamber (18, 118, 218) that is hydraulically connectable to the hydraulic work chamber during the work phase by said plunger piston (9), one additional piston collar (31, 46) is disposed on the work piston (2, 102) or on the piston rod (204), that said piston collar is movable in a hydraulic annular chamber (33, 47, 53) embodied accordingly inside the step bore;

that the piston collar (31, 46), at least toward the end of the work stroke and to brake the reciprocating motion, positively displaces fluid out of the annular chamber (33, 47, 53) through a throttle restriction (34, 44), the throttle restriction on at least one end portion, has a taper, which corresponds to a diameter of the piston collar (31, 46) and the piston collar (31) plunges into a braking chamber (55) toward an end of the stroke and positively displaces a fluid volume enclosed in said braking chamber (35) through the throttle restriction.

2. A machine tool in accordance with claim 1, in which the step piston (1, 101, 201, 301) also positively displaces fluid from the annular chamber (33, 47, 53) through the throttle restrictions (34, 44) at least toward an end of the return stroke and to brake the return stroke motion.

3. A machine tool in accordance with claim 1, in which the annular chamber (33) communicate with the work chamber (16, 33) during the work stroke and/or the return stroke.

4. A machine tool in accordance with claim 1, in which a play defined between the piston collar (31) and the wall (32, 44) of the annular chamber acts as the throttle restriction.

5. A machine tool in accordance with claim 1, in which a relief conduit (42, 43, 51, 54) branches off from the braking chamber (35, 49), and said relief conduit includes a control element (44) therein for controlling a passage of fluid through said relief conduit.

6. A machine tool in accordance with claim 5, in which the relief conduit discharges into the annular chamber.

7. A machine tool in accordance with claim 1, in which a bypass conduit (40) connects the braking chamber (35) to the storage chamber (17, 18), and said bypass conduit includes a check valve that blocks fluid flow in a direction of the storage chamber.

8. A machine tool in accordance with claim 1, in which a bypass conduit (38, 39) connects the annular chamber (33) to the work chamber (16, 116), and said bypass conduit includes a check valve (41) that blocks fluid flow in a direction of the work chamber.

9. A machine tool in accordance with claim 1, in which a short-circuit conduit (45) disposed in the work piston connects the annular chamber (33) to the work chamber (16, 116), an orifice of the short-circuit conduit is present on the piston collar (31) and the short-circuit conduit is closable, at least partially, toward the end of the work stroke, by said taper in the throttle restriction.

10. A machine tool, in accordance with claim 1, in which the storage chamber (18) is disposed in a storage cylinder (19) and is defined via a storage piston (21), which is loaded with low pressure in order to generate a storage pressure on a side remote from the storage chamber (18); that a center axis of the storage cylinder (19) is disposed parallel to but spaced apart from an axis of the work piston (2); and that the storage chamber (18) and work chamber (16) are accommodated inside a common tool housing (6).

11. A machine tool in accordance with claim 10, in which a helical spring (22) serves to generate the low pressure.

12. A machine tool in accordance with claim 10, in which a control rod (24) protrudes to an outside of the storage cylinder (19) and is disposed on the storage piston (21) and has a longitudinal control bore (25), that leads to the storage chamber (18), the end of said conduit remote from the storage chamber (18) discharges into a control chamber (26) that is closed from the outside but is visible from the outside.

13. A machine tool in accordance with claim 12, in which the control chamber (26) is disposed in a transparent glass or plastic control bush secured to the end of the control rod (24).

14. A machine tool in accordance with claim 12, in which the control chamber (26) is ventilated to an outside via a ventilating device (28).

15. A machine tool in accordance with claim 10, in which a hydraulic communication between the storage chamber (18) and work chamber (16) is embodied as a transverse bore (17), which is disposed in the tool housing (6), said transverse bore is accessible from outside, and can be used for oil replenishment.

16. A machine tool in accordance with claim 10, in which the plunger piston (9) is disposed coaxially with the work piston (2) and is actuatable via a pneumatic piston (11) counter to a restoring force.

17. A machine tool in accordance with claim 1, in which the pressure generator has a storage chamber (18) disposed coaxially with the plunger (109), a common longitudinal axis is disposed parallel to that of the step piston (101), having a pressure conduit that connects the pressure generator to the work chamber (116), wherein after the work stroke has ended and after a corresponding replenishing flow of fluid out of the storage chamber (118) into the work chamber (116), the plunger piston (109) blocks the pressure conduit, after which upon a further stroke of the plunger piston (109) a high pressure is generated in the work chamber (116).

18. A machine tool in accordance with claim 1, in which the work chamber (2, 102) toward its free end has a head part (36), in or on which the control elements, such as the piston collar (31) and the bypass conduits (38, 39) are disposed, and which is disconnectably connected to the step piston (1, 101).

* * * * *